United States Patent
Fellows

[11] Patent Number: 5,263,907
[45] Date of Patent: Nov. 23, 1993

[54] TRANSMISSION OF THE TOROIDAL-RACE ROLLING-TRACTION TYPE

[75] Inventor: Thomas G. Fellows, Barnet, England

[73] Assignee: Torotrak (Development) Limited, England

[21] Appl. No.: 916,112

[22] PCT Filed: Jan. 30, 1991

[86] PCT No.: PCT/GB91/00243
§ 371 Date: Jul. 29, 1992
§ 102(e) Date: Jul. 29, 1992

[87] PCT Pub. No.: WO91/11637
PCT Pub. Date: Aug. 8, 1991

[30] Foreign Application Priority Data

Jan. 30, 1990 [GB] United Kingdom ............... 9002060

[51] Int. Cl.⁵ ............................................. F16H 15/08
[52] U.S. Cl. ........................................ 476/40; 476/72; 475/192
[58] Field of Search ............... 476/39, 40, 41, 42, 476/72; 475/192

[56] References Cited

U.S. PATENT DOCUMENTS

| Re. 20,801 | 7/1938 | Gove et al. | 40/476 |
| 2,020,677 | 11/1935 | Erban | 476/40 X |
| 2,786,363 | 3/1957 | Davies et al. | 476/40 |
| 4,484,487 | 11/1984 | Kraus | 40/476 |
| 4,909,092 | 3/1990 | Machida et al. | 476/40 X |

FOREIGN PATENT DOCUMENTS

1610147 11/1990 U.S.S.R. ............... 476/44
673168 6/1952 United Kingdom.

Primary Examiner—Leslie A. Braun
Assistant Examiner—William O. Trousdell
Attorney, Agent, or Firm—Davis, Bujold & Streck

[57] ABSTRACT

A rotatable disc (1, 3) formed with a coaxial part-toroidal race (26, 27) for use as the input or output disc of the variator for a transmission—especially of the full toroidal kind—of the toroidal-race rolling-traction type, in which the torus radius ($r_d$) of the race, that is to say the radius of curvature of the race measured at a chose point on the race and in a plane including the disc axis, decreases as the distance of that point from the disc axis (5) diminishes. Such decrease of the torus radius may be either continuous or discontinuous.

12 Claims, 2 Drawing Sheets

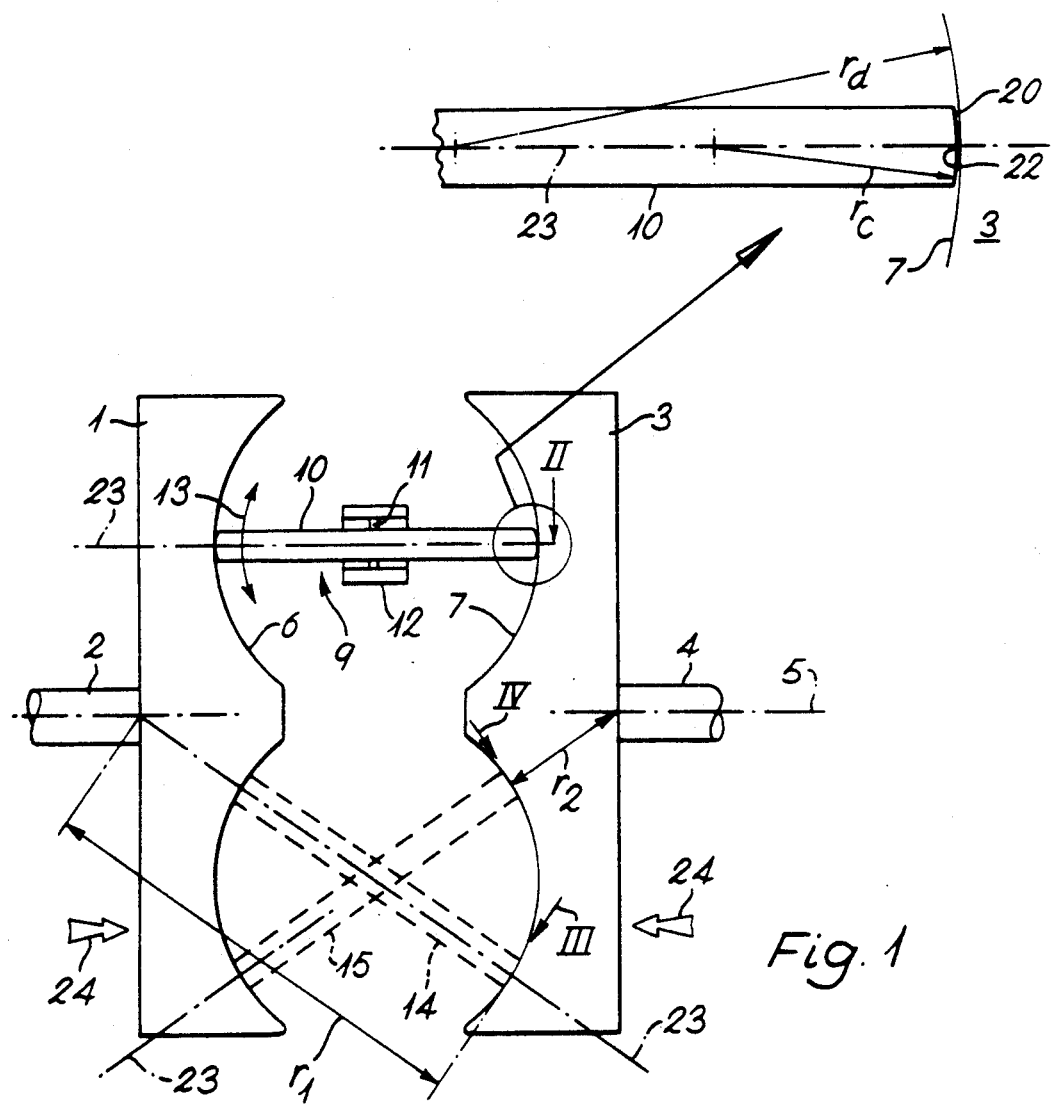
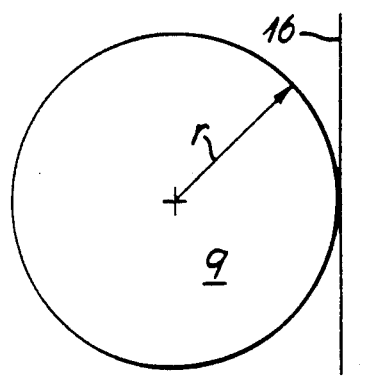
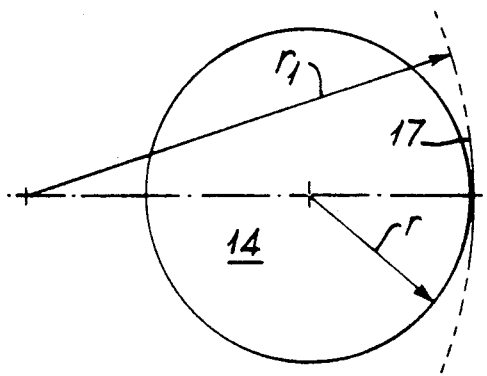
Fig. 1
Fig. 2
Fig. 3

TRANSMISSION OF THE TOROIDAL-RACE ROLLING-TRACTION TYPE

SUMMARY OF THE INVENTION

This invention relates to continuously-variable-ratio transmissions of the toroidal-race rolling-traction type. In the variator, that is to say the ratio-varying component, of such a transmission, coaxial and rotatable input and output discs confront each other, each disc being formed with a part-toroidal race coaxial with the disc itself, the races being complementary and thus conforming to different parts of the surface of a single common torus. Rollers of variable orientation roll in contact with both races, and transmit drive between them. When the roller contacts the output disc at a greater radius (relative to the common axis of the discs) than that at which it contacts the input disc, the output disc will rotate slower than the input disc. Conversely, when the corresponding radius at which the roller contacts the input disc is the greater, the output disc will rotate faster than the input disc. It relates in particular to such transmissions of the so-called "full toroidal" kind in which the races are so shaped that contact between the roller and a race can take place at a radius, measured from the common axis of the discs, that is substantially greater than the corresponding radius of the center of the common torus. It is a characteristic of a transmission of the full toroidal type, that the direction of the normal reaction at each point of contact between a race and a roller passes through the roller center.

BRIEF DESCRIPTION OF THE DRAWING(S)

In the accompanying diagrammatic drawings,

FIG. 1 is a section through the variator of a known transmission of the toroidal-race rolling-traction type and the full toroidal kind, taken in a plane including the transmission axis, and FIGS. 2, 3 and 4 are local views taken in the directions indicated by arrows II, III and IV in FIG. 1.

DESCRIPTION OF THE PREFERRED EMBODIMENT(S)

Figure 4:
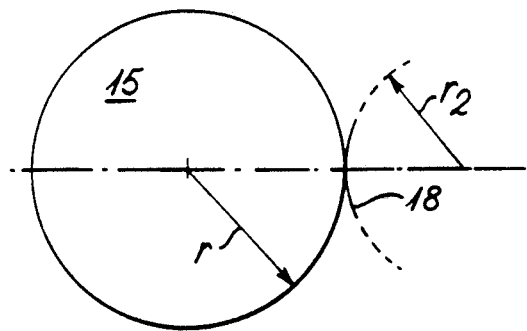

FIG. 1 shows an input disc 1 mounted on an input shaft 2, and an output disc 3 mounted on an output shaft 4. Shafts 2 and 4 share a common axis 5. Input disc 1 is formed with a part-toroidal race 6 and output disc 3 with a corresponding race 7. Although by torus we mean any ring-shaped body generated by rotating any closed plane figure of generally curved outline about a generator line sharing a common plane with the figure but lying outside its outline, in the typical known variator as shown in FIG. 1 the surfaces of races 6 and 7 conform to the surface of the special case of a torus generated by rotating a circle around axis 5, the circle and the axis lying in a common plane at all times. A set of roller—typically three in number—roll in contact with both of races 6 and 7 and transmit drive between them with reversal of direction, so that the direction of rotation of shaft 4 is always opposite to that of shaft 2. One of such rollers is shown at 10; each such roller rotates about an axle 11 which is mounted to rotate in a carriage 12. When carriage 12 is tilted as indicated by arrow 13, by means not shown but well known in the art, the ratio transmitted from disc 1 to disc 3 is varied.

In the upper half of FIG. 1 the roller 10, shown in full lines in the position referenced 9, lies with its diameter parallel to axis 5. Disc 3 therefore rotates at the same speed as disc 1, although with opposite sign. If roller 10 is tilted to the position shown in broken lines at 14 in the lower half of the Figure disc 3 will rotate slower than disc 1. Conversely if the roller is tilted to the position shown in broken lines at 15, disc 3 will rotate faster than disc 1.

As is shown in the arrowed enlarged view attached to FIG. 1, the rim 20 of roller 10 is rounded at a radius $r_c$, known as the roller cross-radius and measured in a plane including the variator axis 5, that is smaller than the local torus radius $r_d$ of the race 7 measured in the same plane. In practice, $r_d$ is likely to be, say, twice $r_c$. Unless the position of the roller centre is otherwise constrained the normal to the common tangent to the two curves at the centre 22 of the contact between roller and disc will pass through the roller centre.

FIGS. 2 to 4 illustrate, with exaggerated proportions, the nature of the contact between the roller and one of the races (in this case the output race 7), when the roller is in the positions shown at 9, 14 and 15 in FIG. 1, and when viewed as in the diametral plane 23 of the roller in each case. In each case the contact is as between two curves, both lying in the diametral plane 23 of the roller. The first of these is the circumference of the roller, which is a circle of constant radius r. The second curve approximates to the arc of a circle in the small region of the contact: the radius of this circular arc is therefore the "local radius" of the race, measured in the diametral plane. When the roller is in position 9 the contact is as between first (9) and second (16) circles of radius r and infinity, as FIG. 2 shows. The radius of the second circle is infinite because the diametral plane of the roller lies parallel to the axis 5, and the surface of the second circle is therefore a straight line. When the roller is in position 14, as shown in FIG. 3, the contact is as between first (14) and second (17) circles of radius r (convex) and $r_1$ (concave), $r_1$ being the local disc radius at the point of contact. FIG. 4 shows that when the roller is in position 15 the contact is as between first (15) and second (18) circles of radius r (convex), and $r_2$ (convex), $r_2$ again being the local disc radius at the point of contact.

The contact between disc and roller is usually through the medium of an intervening film of traction fluid. Also, due to the axial load which is applied to the discs (as indicated at 24 in FIG. 1) to urge them and the rollers into the necessary traction transmitting engagement, the effective engagement between roller and disc will be an area contact.

Generally, the area of contact between roller and race for any given loading is determined by the four radii already mentioned: roller radius r, roller cross-radius $r_c$, torus radius $r_d$ and the local disc radius ($r_1$ or $r_2$) measured in plane 23. Each of the four radii just referred to is to be considered as having the magnitude that exists in the uncompressed state, i.e. before the application of any load between the disc and the roller. The smaller the area of the contact the higher the stress, and the shorter the life of the contacting components. Smaller areas, however, tend to give higher efficiency. Where the plane of the roller is parallel to the axis 5, as in position 9 of FIG. 2, the two points of contact between the roller and the races 6 and 7 are equidistant from the variator axis 5, and the local disc radii $r_1$ and $r_2$ at the two points of contact are also both equal and are infinite in magnitude. As soon as the ratio changes so that the roller contacts one race at an inner contact (i.e. closer to axis 5) and the other race at an outer (more distant) contact, local disc radius $r_2$ at the inner contact becomes smaller and the contact as seen in plane 23 is as between two convex circles: the area of contact therefore diminishes. At the outer contact however, the area of contact between the roller and a now-concave surface, of local radius $r_1$, progressively increases as the magnitude of $r_1$, like that of $r_2$, progressively falls. According to the invention, such a progressive change in the two areas of contact, and the consequent stress set up in the disc, is modified by causing the local torus radius $r_d$ of the two races to vary from point to point. At the inner contact the effect of a small convex local disc radius $r_2$ can be offset by reducing $r_d$, and so increasing the area of contact. To compensate, the local torus radius $r_d$ at the outer contact is increased. In accordance with the theory already referred to, this is likely to result in little overall change in efficiency, with a drop at the inner contact roughly compensated for by a rise at the outer contact. However, a net gain in fatigue life can be obtained because life is inversely proportional to a high power of stress and tends, therefore, to be dominated by conditions at the inner contact. The invention is thus to be contrasted with the teaching of such prior patent specifications as GB-A-673168, in which the transmission is not "full toroidal" but instead of the so-called "half toroidal" type, and in which the local torus radius changes in the opposite sense and for quite different reasons.

The invention is defined by the claims, includes a disc and variator as described with reference to the accompanying drawings, and will now be illustrated with reference to FIG. 5 in which roller 10, with its rim 20 rounded as before, is again shown (as in full lines in FIG. 1) with its diametral plane 23 parallel to the axis 5. Input and output races 26 and 27, between which the roller transmits drive, are mirror images one of the other, so that the input and output discs 1 and 3 rotate at the same speed but in opposite directions, as they did before when the roller was in position 9 in FIG. 1. Also as before, the points 28, 29 on races 26 and 27, at which those races make contact with the roller, lie on the plane 23. However, the curvatures of races 26, 27 are no longer uniform. Instead, those curvatures, inboard and outboard of points 28 and 29 respectively, are such that if roller 10 is tilted anti clockwise to a position as indicated in broken lines at 35, the curvatures of the two races conform to arcs of circles centered at a point 36 which lies on diameter 23 but is displaced from roller centre 37 so that the curvature of the inboard part of each race, viewed in a plane including axis 5, is tighter than that of the outboard part. In simple terms the effect of this compound curvature of each disc is to modify the disc/roller contact inboard of the line 28-29 so as to enlarge the effective area of contact between roller and disc and relieve the high stress already referred to. Conversely, outboard of the line 28-29, disc/roller contact is modified so as to diminish the effective area of contact between the roller and the disc, but the diminution will be insignificant because conditions at the inner contact are dominant as already explained.

In FIG. 1, where the races 6, 7 conform to a common torus of truly circular cross-section, the centre of the roller 10 always lies on the centre circle of that torus. Where the disc races are of compound curvature, according to the invention, the centre 37 of the roller and the effective centre of the common torus will no longer be confined to the circumference of a single circle drawn around axis 5. Instead, as the roller tilts between the two extremes of its range of movement, the roller centre and effective torus centre will be required to move along a locus the shape of which is indicated roughly by the line 38 in FIG. 5, and means must of course be found to mount the roller carriage 12 (FIG. 1) and its operating mechanism to permit that movement. Where the races conform to toruses of different cross-sections, the shape of the locus could of course be different also.

Figure 5:
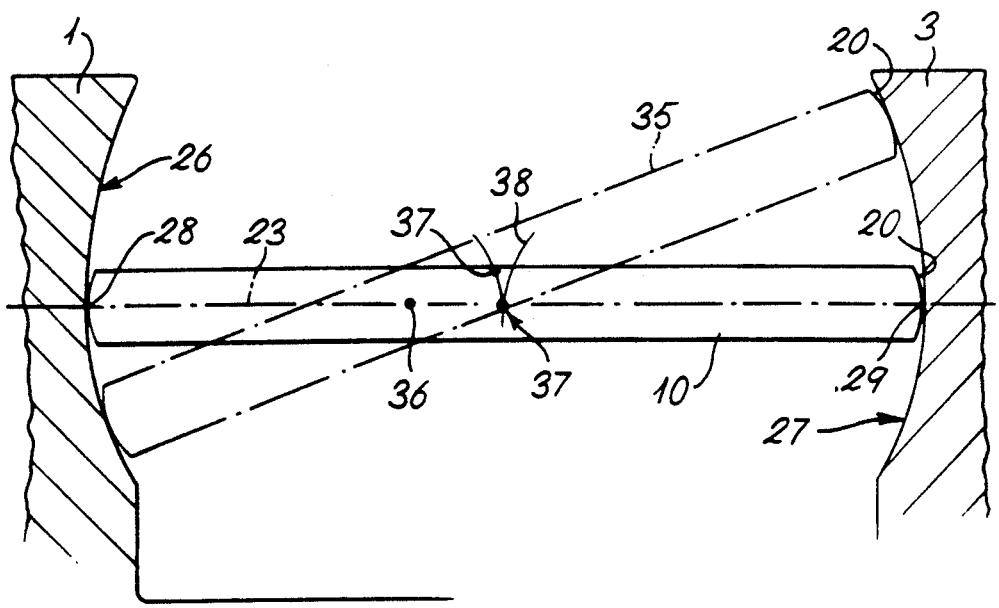
FIG. 5 is a section through the variator of a toroidal-race rolling-traction type transmission.

The invention is not limited to the kind of races actually shown in the simple example of FIG. 5, where for each of races 26 and 27 two different curvatures meet discontinuously at the line 28-29. A continuous change of effective radius, from the most outboard extremity of the race to the most inboard, may be more advantageous, and yet other strategies of curvature variation may be adopted to achieve other desired balances between efficiency and life. Curvature variations are, however, subject to two fundamental limitations. The curvature of the outboard part of one disc must be related to the curvature of the inboard part of the other disc, so that the contacts between the roller and the races always lie in the diametral plane (23) of the roller, and, and the mounting of the roller carriage must allow the roller centre the freedom of movement that it requires to permit that coincidence between the contacts and the diametral plane.

I claim:

1. A rotatable disc (1, 3) formed with a coaxial part-toroidal race (26, 27, FIG. 5), and suitable for use as the input or output disc of the variator for a transmission of the toroidal-race rolling-traction type, characterised in that the torus radius ($r_d$, FIG. 1) of the race, that is to say the radius of curvature of the race measured at a chosen point on the race and in a plane including the disc axis, decreases as the distance of that point from the disc axis diminishes.

2. A disc according to claim 1 characterised in that the torus radius of the race decreases continuously.

3. A disc according to claim 1 characterised in that there is a discontinuous change in the torus radius of the race as the disc axis is approached.

4. A disc according to claim 3 characterised in that the torus radius of the race has a constant value over that part of the race lying more than a predetermined distance from the disc axis, and a different and lesser constant value over the remainder of the race.

5. A variator for a transmission of the toroidal-race, rolling-traction type, characterised by including two complementary rotatable discs (input and output) according to claim 1.

6. A variator for a transmission of the so called "full toroidal" variety of the toroidal-race rolling-traction type, in which the direction of the normal force of reaction at each contact between a race and a traction-transmitting roller always passes through the roller centre (37), characterised by including two complementary rotatable discs (input and output) according to any of claim 1.

7. A variator for a transmission of the toroidal-race, rolling-traction type, characterized by including two complementary rotatable discs (input and output) according to claim 2.

8. A variator for a transmission of the toroidal-race, rolling-traction type, characterized by including two complementary rotatable discs (input and output) according to claim 3.

9. A variator for a transmission of the toroidal-race, rolling-traction type, characterized by including two complementary rotatable discs (input and output) according to claim 4.

10. A variator for a transmission of the so called "full toroidal" variety of the toroidal-race rolling-traction type, in which the direction of the normal force of reaction at each contact between a race and a traction-transmitting roller always passes through the roller centre (37), characterized by including two complementary rotatable discs (input and output) according to claim 2.

11. A variator for a transmission of the so called "full toroidal" variety of the toroidal-race rolling-traction type, in which the direction of the normal force of reaction at each contact between a race and a traction-transmitting roller always passes through the roller centre (37), characterized by including two complementary rotatable discs (input and output) according to claim 3.

12. A variator for a transmission of the so called "full toroidal" variety of the toroidal-race rolling-traction type, in which the direction of the normal force of reaction at each contact between a race and a traction-transmitting roller always passes through the roller centre (37), characterized by including two complementary rotatable discs (input and output) according to claim 4.

* * * * *